(12) United States Patent
Coker et al.

(10) Patent No.: US 8,665,545 B2
(45) Date of Patent: Mar. 4, 2014

(54) SHINGLED MAGNETIC RECORDING (SMR) DISK DRIVE WITH VERIFICATION OF WRITTEN DATA

(75) Inventors: Jonathan Darrel Coker, Rochester, MN (US); Martin Aureliano Hassner, Mountain View, CA (US); Kirk Hwang, Palo Alto, CA (US); Bruce Alexander Wilson, San Jose, CA (US); Roger William Wood, Gilroy, CA (US)

(73) Assignee: HGST Netherlands B.V., Amsterdam (NE)

( * ) Notice: Subject to any disclaimer, the term of this patent is extended or adjusted under 35 U.S.C. 154(b) by 177 days.

(21) Appl. No.: 13/316,629

(22) Filed: Dec. 12, 2011

(65) Prior Publication Data

US 2013/0148225 A1    Jun. 13, 2013

(51) Int. Cl.
  *G11B 5/09* (2006.01)
  *G11B 27/36* (2006.01)
(52) U.S. Cl.
  USPC .................................. 360/53; 360/31; 360/48
(58) Field of Classification Search
  None
  See application file for complete search history.

(56) References Cited

U.S. PATENT DOCUMENTS

| 6,757,119 | B2 * | 6/2004 | Leow et al. ..................... 360/31 |
| 7,774,540 | B2 | 8/2010 | Han et al. |
| 7,965,465 | B2 | 6/2011 | Sanvido et al. |
| 2002/0009294 | A1 * | 1/2002 | Nishimura ..................... 386/124 |
| 2008/0174908 | A1 | 7/2008 | Wang |
| 2009/0251819 | A1 | 10/2009 | Lee et al. |
| 2010/0188767 | A1 * | 7/2010 | Hirose et al. ..................... 360/31 |
| 2010/0232057 | A1 * | 9/2010 | Sanvido et al. ............ 360/78.04 |
| 2011/0119498 | A1 | 5/2011 | Guyot |
| 2012/0233432 | A1 * | 9/2012 | Feldman et al. .............. 711/170 |

OTHER PUBLICATIONS

Cassuto et al., "Indirection systems for shingled-recording disk drives", Mass Storage Systems and Technologies (MSST), 2010 IEEE 26th Symposium on May 3-7, 2010, Incline Village, NV, pp. 1-14.

Amer et al., "Design issues for a shingled write disk system", Mass Storage Systems and Technologies (MSST), 2010 IEEE 26th Symposium on May 3-7, 2010, Incline Village, NV, pp. 1-12.

* cited by examiner

*Primary Examiner* — Regina N Holder
(74) *Attorney, Agent, or Firm* — Thomas R. Berthold

(57) ABSTRACT

A "write-squeeze-verify" method is used for verification of the data that has been written in the annular bands of a shingled magnetic recording disk drive. The writing of data along a track overwrites a portion of the previously written track and thus "squeezes" the data of the previously written track to thereby form a "shingled data track" (SDT). The data in each SDT is read back and verified by an error correction check using error correction bits associated with the data written in the SDT, or by comparing the readback data with the data stored in memory. If the data read back is not verified, a write error counter is incremented and a write error frequency is calculated. One or more attempts to write the data can be performed. If the data in the SDT cannot be verified after the attempted rewrite(s), then a "re-try fail" is reported.

7 Claims, 5 Drawing Sheets

SHINGLED MAGNETIC RECORDING (SMR) DISK DRIVE WITH VERIFICATION OF WRITTEN DATA

TECHNICAL FIELD

This invention relates generally to a "shingled" magnetic recording (SMR) disk drive, and more specifically to a method for verification of the data that has been written so as to assure that adequate data reliability may be achieved at the higher recording densities provided by SMR disk drives.

BACKGROUND OF THE INVENTION

Magnetic recording disk drives that use "shingle writing", also called "shingled recording" or "shingled magnetic recording" (SMR), have been proposed. In SMR, the write head, which is wider than the read head in the cross-track direction, writes magnetic transitions by making a plurality of consecutive circular paths that partially overlap. The non-overlapped portions of adjacent paths form the shingled data tracks, which are thus narrower than the width of the write head. The data is read back by the narrower read head. The narrower shingled data tracks thus allow for increased data density. The shingled data tracks are arranged on the disk as annular regions or bands separated by annular inter-band gaps. When data is to be re-written or updated, all of the shingled data tracks that were written after the track being updated was written are also re-written. SMR is well-known in the art, for example as described in U.S. Pat. No. 6,185,063 B1 and U.S. Pat. No. 6,967,810 B2.

However, attempting to pack tracks very closely together risks the newly written track causing damage to the adjacent previously written tracks. Because of this risk, it is valuable to have a method of verifying data previously written on an adjacent track(s) in a SMR disk drive.

SUMMARY OF THE INVENTION

The invention relates generally to a method for verification of the data that has been written in the annular bands of a SMR disk drive. The write head makes successive paths or tracks to form the shingled data tracks (SDTs) in the bands. The writing of data along a track overwrites a portion of the previously written track and thus "squeezes" the data of the previously written track to thereby form the SDT. The method of this invention is referred to as "write-squeeze-verify" (WSV) because the data in each SDT is verified after the SDT is formed. The data written in each SDT is read back after it is written. The readback data from the SDT is verified by performing an error correction check using error correction bits associated with the data written in the SDT, or by comparing the readback data with the data stored in memory. If the data read back is not verified, this indicates there has been a write error and a write error counter (WEC) is incremented and a write error frequency (WEF) is calculated. If the data read back from the SDT cannot be verified, then a second (or more) attempt(s) to write the data can be performed. If the data in the SDT cannot be verified after the attempted rewrite(s), then a "re-try fail" is reported. However, if the data is verified after the second write attempt, this indicates that the errors were correctable by the ECC and a correctable error counter (CEC) is incremented. The CEC enables the disk drive to monitor the number of near-failures, which may indicate a degradation of the recording media in certain regions of the disk.

The WEF may calculated for all write errors in all bands, or may be calculated as separate WEF values for each band or group of bands. Thus the WSV may be turned off for writing to just certain bands or groups of bands, which improves the efficiency of writing to the bands because the time for the required disk rotations to read the SDTs is eliminated. Also, if WEF exceeds some predetermined threshold for a particular region of the disk (i.e., a particular band or group of bands), then that region may be re-formatted at a lower track density if the SMR disk drive includes the capability of formatting at different track densities.

For a fuller understanding of the nature and advantages of the present invention, reference should be made to the following detailed description taken together with the accompanying figures.

DETAILED DESCRIPTION OF THE INVENTION

Figure 1:
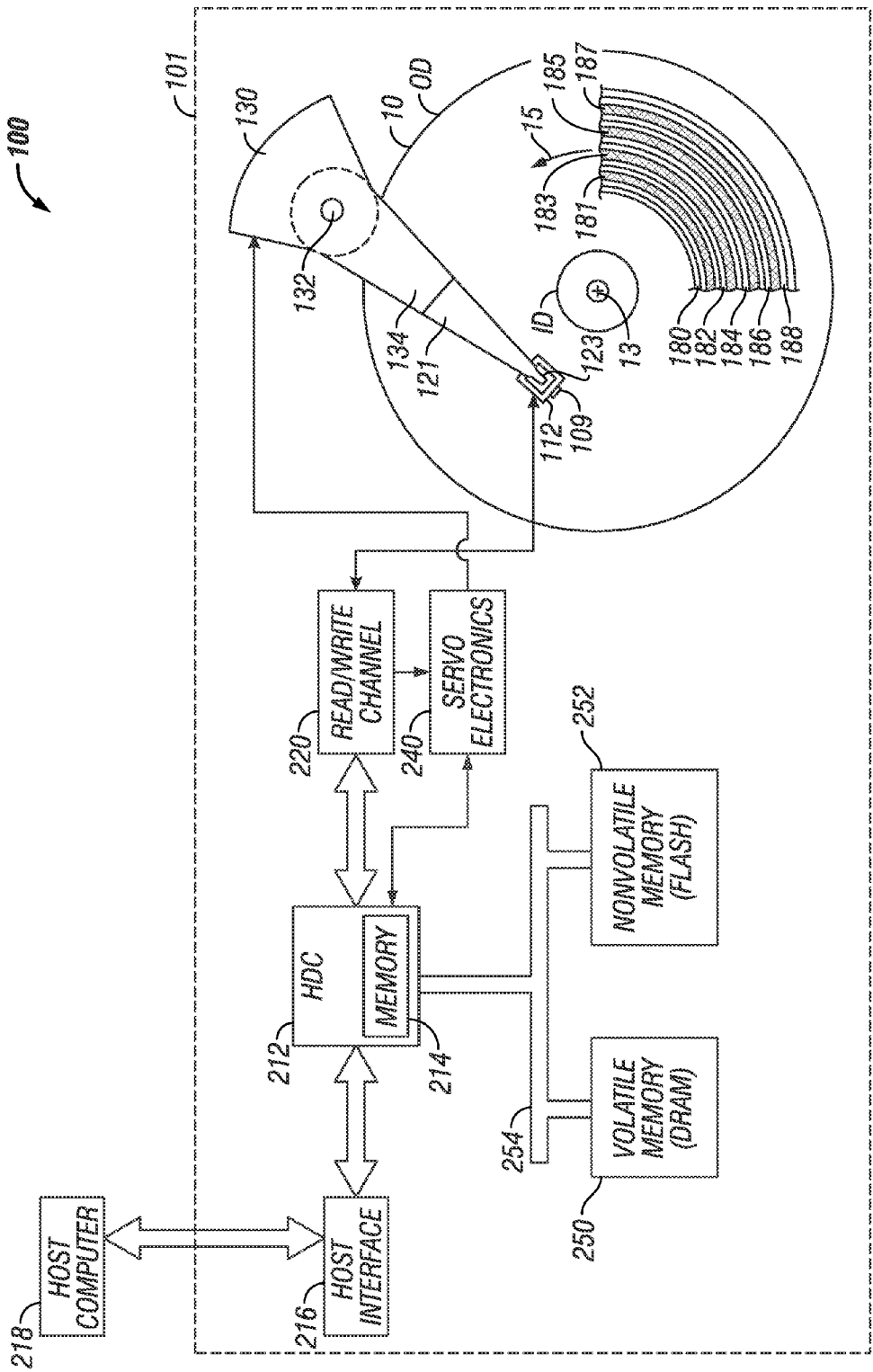
FIG. 1 is a top view of a SMR disk drive for use with the method according to the invention.

FIG. 1 is a top view of a disk drive 100 with shingled recording according to the invention. The disk drive has a housing or base 101 that supports an actuator 130 and a spindle motor (not shown) for rotating the magnetic recording disk 10 about its center 13 in the direction indicated by arrow 15. The actuator 130 may be a voice coil motor (VCM) rotary actuator that has a rigid arm 134 and rotates about pivot 132. A head-suspension assembly includes a suspension 121 that has one end attached to the end of actuator arm 134, a flexure 123 attached to the other end of suspension 121, and a head carrier, such as an air-bearing slider 122, attached to the flexure 123. The suspension 121 permits the slider 122 to be maintained very close to the surface of disk 10 and the flexure 123 enables the slider 122 to "pitch" and "roll" on an air-bearing generated by the rotating disk 10. The slider 122 supports the read/write or recording head 109 located on the end face 112 of slider 122. The recording head 109 is typically a combination of an inductive write head with a magnetoresistive read head (also called a read/write head). Only one disk surface with associated slider and recording head is shown in FIG. 1, but there are typically multiple disks stacked on a hub that is rotated by a spindle motor, with a separate slider and recording head associated with each surface of each disk.

In this invention the disk drive uses shingled magnetic recording (SMR), also called shingled writing. Thus FIG. 1 also illustrates portions of the circular shingled data tracks grouped as annular regions or bands on the recording layer of disk 10. Only portions of five bands 180, 182, 184, 186 and 188 are depicted, but there would typically be a large number of bands. Adjacent bands are separated by inter-region or inter-band annular gaps, such as typical gaps 181, 183, 185 and 187. For example, for a 2.5 inch disk drive with shingled recording, the shingled data tracks may have a cross-track width (TW) of about 50 nm with each band containing several hundred tracks and with each gap separation between the bands being about 100 nm (or about 2 TW). In shingled recording the write head, which is wider than the read head in the cross-track direction, writes magnetic transitions by making a plurality of consecutive circular paths or tracks that partially overlap. The non-overlapped portions of adjacent paths or tracks form the shingled data tracks, which are thus narrower than the width of the write head. The data is read back by the narrower read head. When data is to be re-written in a shingled data track, all of the shingled data tracks that have been written after the track to be re-written are also re-written.

As is well known in the art, the data in each shingled data track in each of the bands is also divided into a number of contiguous physical data sectors (not shown). Each data sector is preceded by a synchronization (sync) field, which is detectable by the read head for enabling synchronization of reading and writing the data bits in the data sectors. Also, each shingled data track in each of the bands includes a plurality of circumferentially or angularly-spaced servo sectors (not shown) that contain positioning information detectable by the read head for moving the read/write head 109 to the shingled data tracks and maintaining the read/write head 109 on the tracks. The servo sectors in each shingled data track are typically aligned circumferentially with the servo sectors in the other shingled data tracks so that they extend across the shingled data tracks in a generally radial direction.

The disk drive 100 also includes a hard disk controller (HDC) 212 that can include and/or be implemented by a microcontroller or microprocessor. The controller 212 runs a computer program that is stored in memory 214 and that embodies the logic and algorithms described further below. The memory 214 may be separate from controller 212 or as embedded memory on the controller chip. The computer program may also be implemented in microcode or other type of memory accessible to the controller 212. The controller 212 is connected to a host interface 216 that communicates with the host computer 218. The host interface 216 may be any conventional computer-HDD interface, such as Serial ATA (Advanced Technology Attachment) or SCSI (Small Computer System Interface).

The electronics associated with disk dive 100 also include servo electronics 240. In the operation of disk drive 100, the read/write channel 220 receives signals from the read head and passes servo information from the servo sectors to servo electronics 240 and data signals from the data sectors to controller 212. Servo electronics 240 typically includes a servo control processor that uses the servo information from the servo sectors to run a control algorithm that produces a control signal. The control signal is converted to a current that drives actuator 130 to position the read/write head 109. In the operation of disk drive 100, interface 216 receives a request from the host computer 218 for reading from or writing to the data sectors. Controller 212 receives a list of requested data sectors from interface 215 and converts them into a set of numbers that uniquely identify the disk surface, track and data sector. The numbers are passed to servo electronics 240 to enable positioning read/write head 109 to the appropriate data sector.

The controller 212 acts as a data controller to transfer blocks of write data from the host computer 218 through the read/write channel 220 for writing to the disk 10 by the write head, and to transfer blocks of read data from the disk 10 back to the host computer 218. Disk drives typically include, in addition to the rotating disk storage, solid state memory (referred to as "cache") that temporarily holds data before it is transferred between the host computer and the disk storage. The conventional cache is dynamic random access memory (DRAM), a volatile form of memory that can undergo a significant number of write/erase cycles and that has a high data transfer rate. Disk drives may also include nonvolatile memory. One type of nonvolatile memory is "flash" memory, which stores information in an array of floating gate transistors, called "cells" which can be electrically erased and reprogrammed in blocks. Thus in disk drive 100, the controller 212 also communicates with volatile memory 250 (shown as DRAM) and optional nonvolatile memory 252 (shown as FLASH) via data bus 254.

Figure 2:
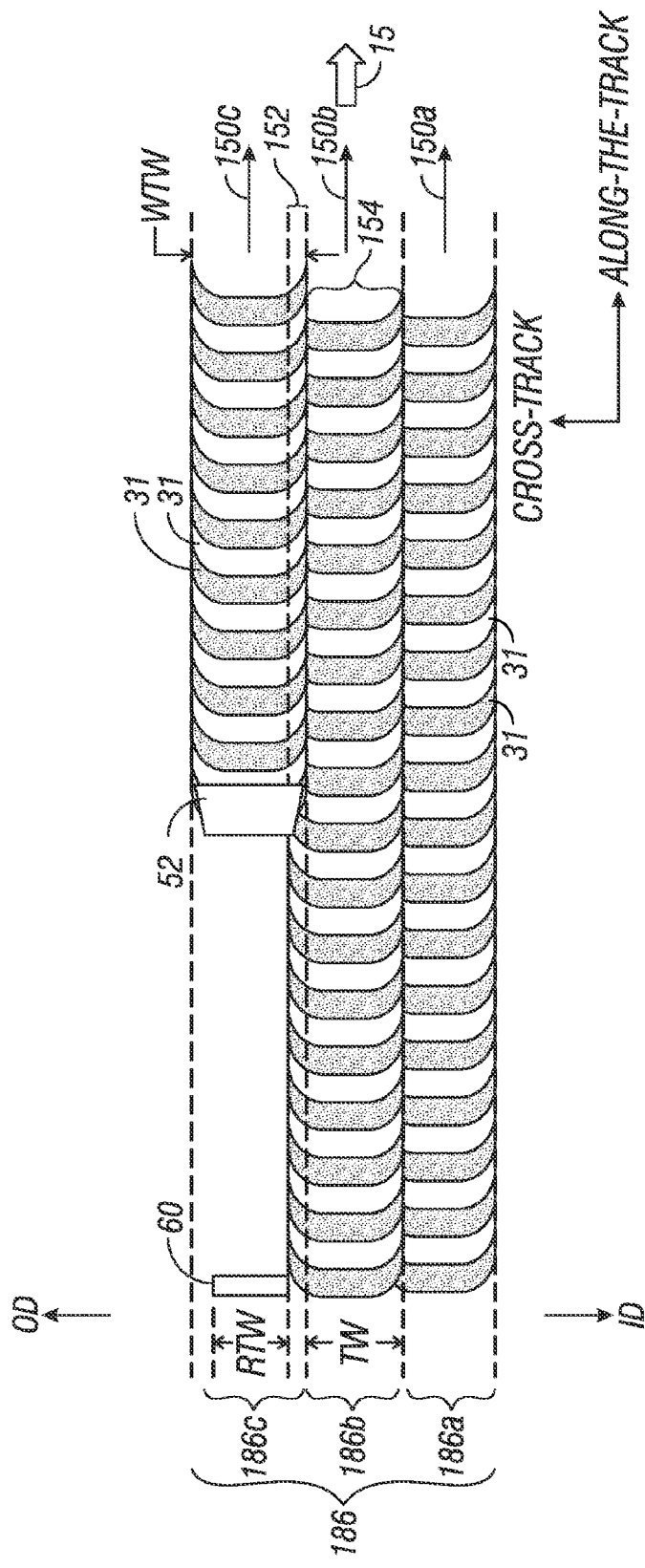
FIG. 2 is a view from below the recording layer of the disk toward the air-bearing surface (ABS) of the head carrier and illustrates the method of SMR.

FIG. 2 is a view of a portion of the recording layer of the disk and is intended to be a graphical representation of the method of recording magnetized regions on the disk using SMR. Two concentric shingled data tracks 186a and 186b of a typical annular region or band (like annular band 186 in FIG. 1) are shown, along with a path or track of magnetic transitions aligned with the write head's pole tip 52 that will result in a third shingled data track 186c. The write pole tip 52 has a cross-track width (WTW) that is wider than the read head sensing edge 60 cross-track width (RTW). When writing data, the write pole tip 52 generates paths of magnetic transitions (shown as the transitions between white and shaded magnetized regions 31) as the recording layer moves in the direction of arrow 15. In SMR, whenever any portion of the data in an annular band is to be re-written or updated, all of the shingled data tracks in that annular band that were written after the shingled data track being updated are also re-written. To write the magnetic transitions that result in the three shingled data tracks the write head first writes a track centered along line 150a, after which the actuator moves the write head radially by an incremental distance to write a track of magnetic transitions centered along line 150b, after which the actuator moves the write head radially by an incremental distance to write a track of magnetic transitions along line 150c. Track 150b overlaps a portion of track 150a and track 150c overlaps a portion of track 150b. For example, track 150b has an overlapped portion 152 and a non-overlapped portion 154. The writing of two successive tracks, like tracks 150a and 150b, results in the formation of a shingled data track, i.e., shingled data track 186a. After all the tracks in an annular band have been written in the SMR method, the data resides in the non-overlapped portions, as shown by shingled data tracks 186a, 186b. The written shingled data tracks thus have a radial track width (TW) that is typically slightly less than WTW and slightly greater than RTW of the read head sensing edge 60a. For example, RTW is typically 0.6 to 0.7 times TW. In the example of FIG. 2, the bottom of the figure is meant to be a radially inner portion of the band 186, so in this example the shingled data tracks are written in the direction from the disk inside diameter (ID) to outside diameter (OD). However, a disk drive can be formatted such that writing of the shingled data tracks in one or more bands can be from OD to ID, with different bands being written in different directions.

In this invention, whenever a band is written, the data in each shingled data track that is written is verified. The writing of data to an entire band may occur when new data from the host is stored in memory and then written to a band for the first time. It may also occur when a portion of the data in a band is modified, i.e., a "read-modify-write" operation in which all the data in a band is read and stored in memory, then a portion is modified with the host-provided new write data, and finally all the data is written data back to the band. The writing of data to an entire band or bands may also occur when a band or bands are "cleaned" or "de-fragmented" to reclaim free space, i.e., the data in one or more bands is read and stored in memory and then re-written to the same band or a new band.

Figure 3:
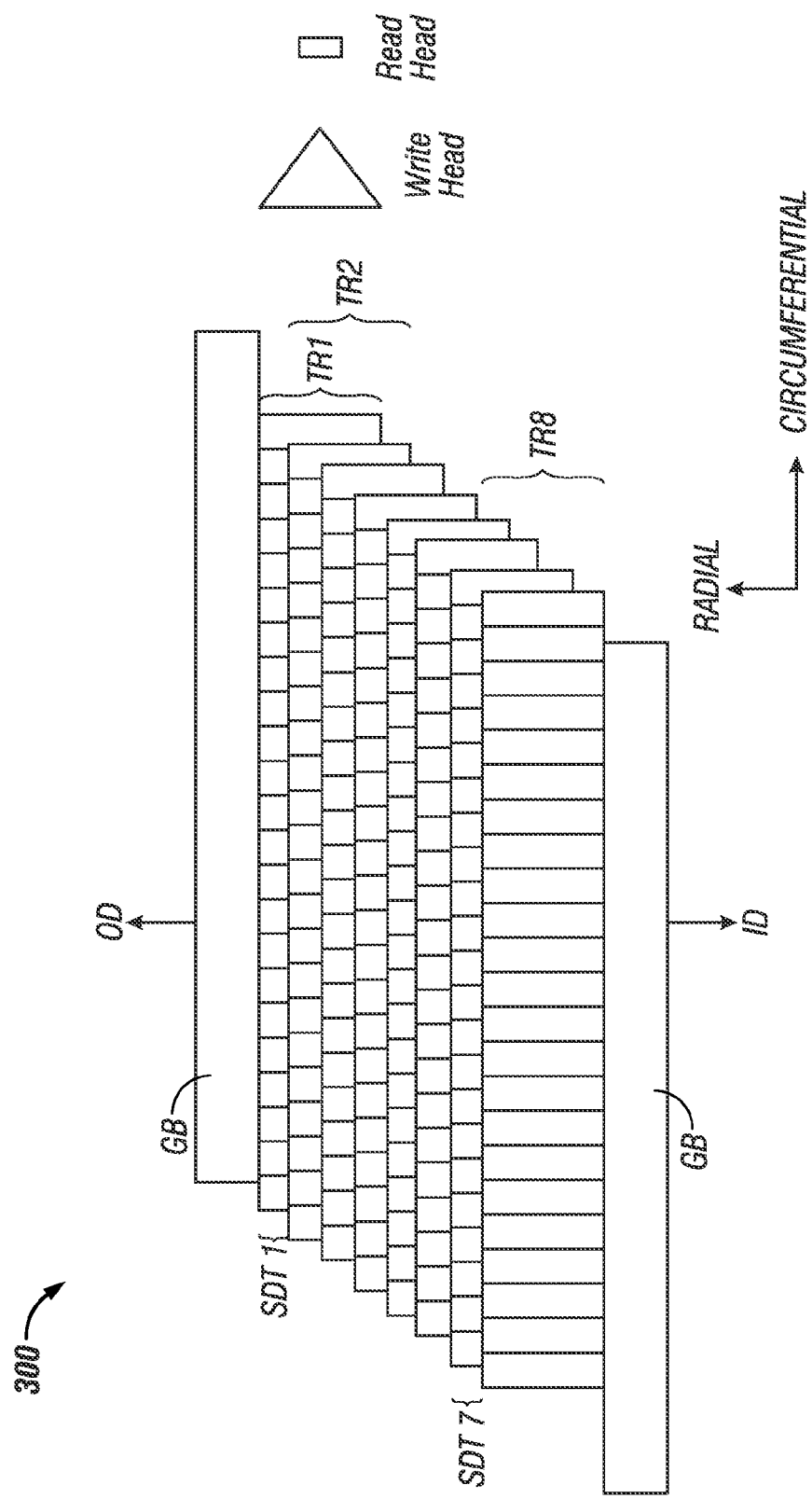
FIG. 3 is a schematic showing a typical band on a SMR disk and illustrates the multiple overlapping tracks that define the shingled data tracks.

FIG. 3 is a schematic of a shingled region or band 300 for use in describing the method of the invention. A band will have N shingled data tracks (SDTs), with N typically being several hundred; however N=7 in band 300 of FIG. 3 for ease of illustration. Band 300 has guard bands (GBs) that separate it from radially adjacent bands. The write head makes successive paths or tracks (TRs) to form the SDTs which, in the example of FIG. 3, are written in the direction from disk OD to disk ID. For example, the actuator positions the write head to write data along track 1 (TR1), then moves the write head to write data along track 2 (TR2). The writing of data along TR2 overwrites a portion of the previously written TR1 and thus "squeezes" the data of TR1 to thereby form the first shingled data track (SDT1). The method of this invention is referred to as "write-squeeze-verify" (WSV) because the data in each SDT is verified after the SDT is formed. For example, the data in SDT1 is verified after TR1 has been "squeezed" by TR2. Successive writing of tracks TR3 to TR(N+1) thus results in the writing of all N SDTs in the band.

Figure 4:
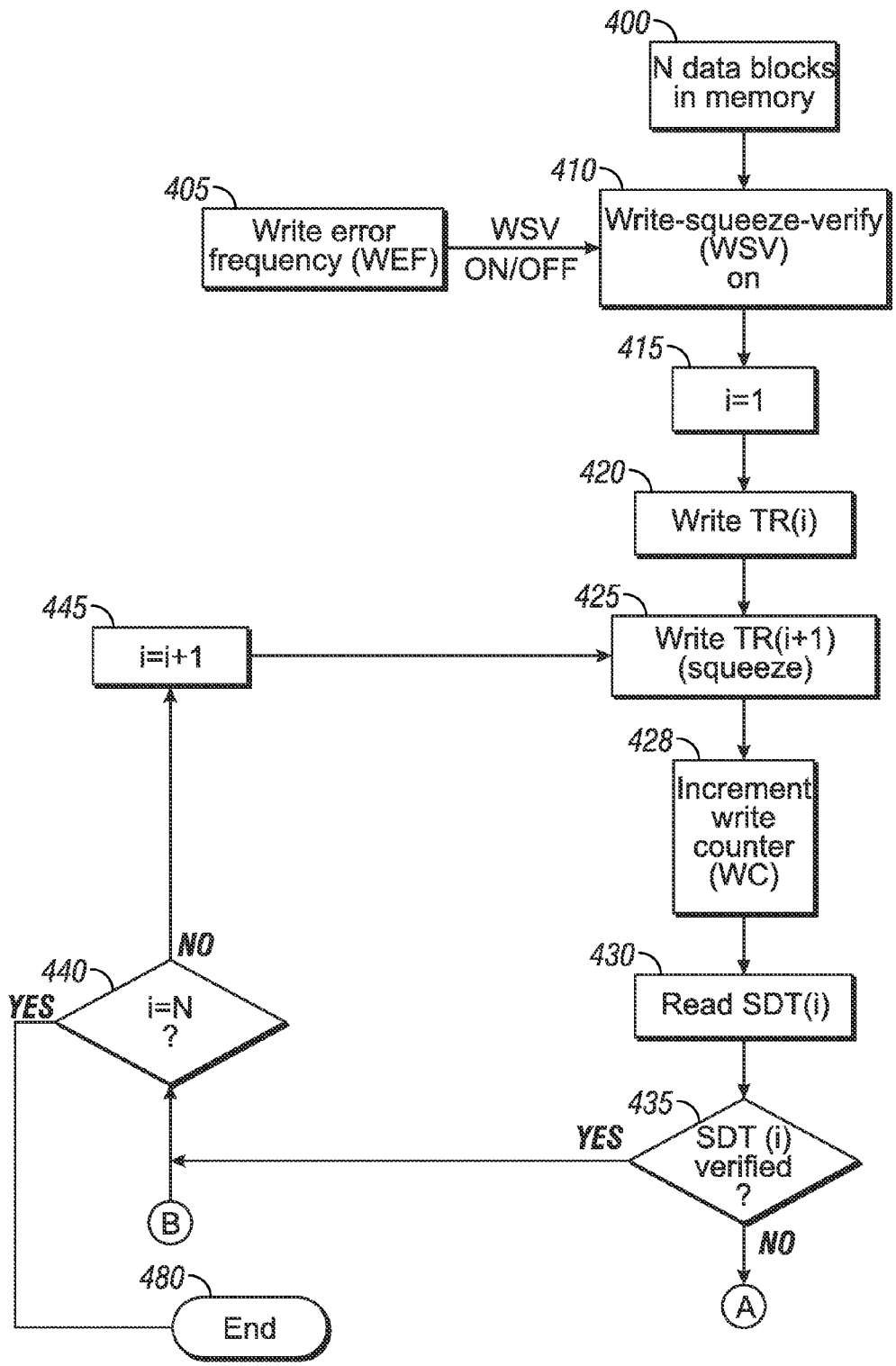
FIG. 4 is a flow chart illustrating the method of the invention.
Figure 4:
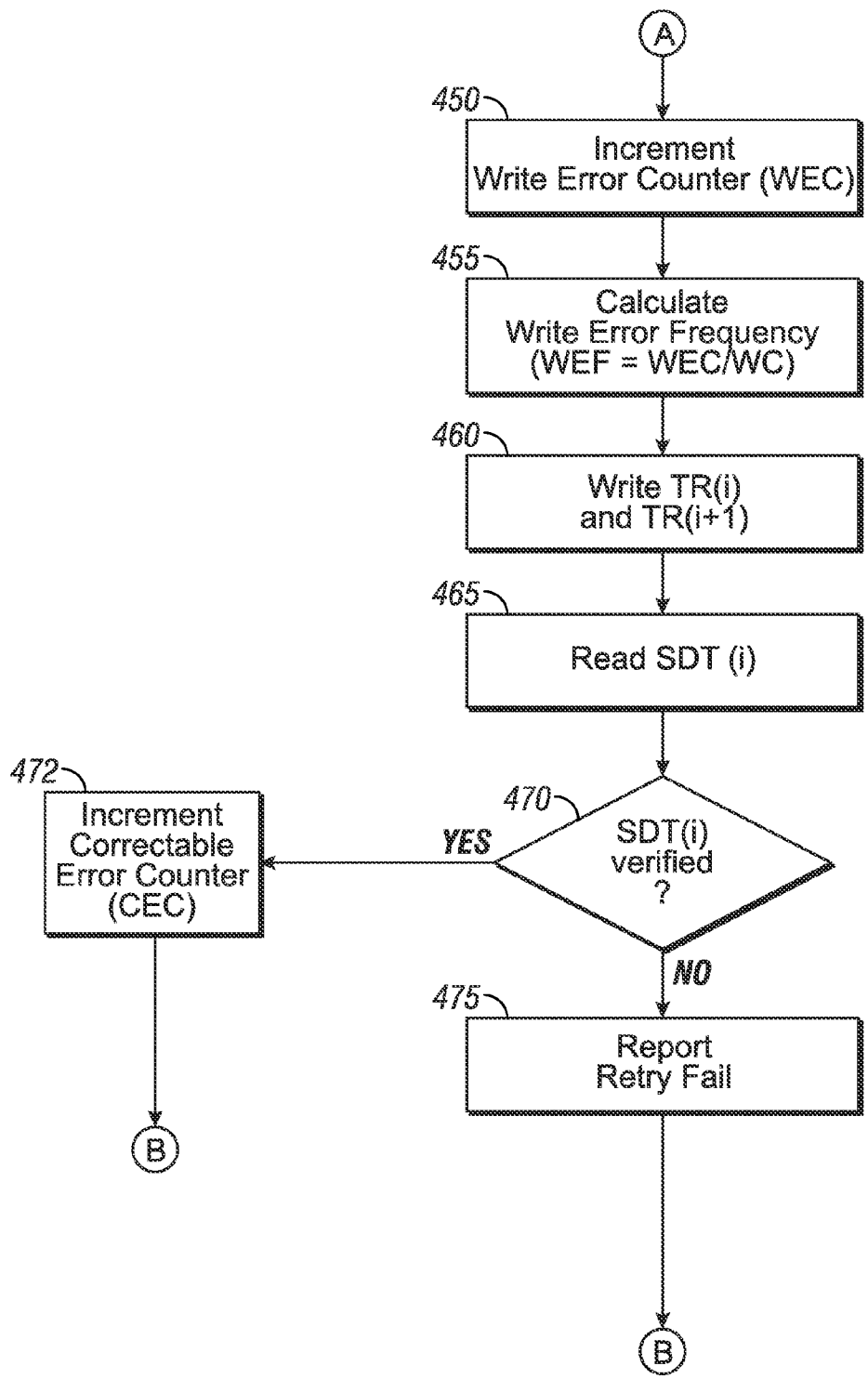

FIG. 4 is a flow chart describing the method of the invention. At 400, the N blocks of data to be written are in memory, for example nonvolatile memory 250 or volatile memory 252 (FIG. 1). In this example a block of data is one track of data. WSV is turned on at 410. WSV may be turned on or off by the user, or may be turned on automatically at various times, such as at disk drive power-on or at idle times when the data is to be cleaned. In this invention WSV may also be turned on or off at 405 based on the value of a calculated write-error frequency (WEV), as will be explained below. At 415 a track (TR) counter is initialized at i=1. At 420, the actuator positions the write head to TR(i=1), and the data to be written is recalled from memory and written to TR(i=1). The writing of data also includes the writing of parity bits or error correction bits. The use of an error correction code (ECC) in disk drives is well-known and involves writing parity bits or error correction bits at the ends of data sectors or data tracks, where the parity bits or error correction bits are computed from the data to be written, using an algorithm, like one of the well known ECC algorithms. At 425, the actuator positions the write head to write the successive radially-adjacent TR(i+1), and the data to be written is recalled from memory and written to TR(i+1) along with the error correction bits. This squeezes TR1 and thus results in the writing of SDT(i). At 428 a write counter (WC) is incremented, which counts the number of track writes. At 430 the actuator positions the read head to read SDT(i) and the data is read back from SDT(i).

At 435, the data read back from SDT(i) is then verified. The verification can be by one of two methods. In a first method the ECC bits associated with the data are also read back and used to perform an ECC check on the data. If the ECC check returns no errors, this means that the readback data bits and ECC bits are readable and accurate. The ECC check is thus a double-check or parity-check on the data and associated ECC bits that were "squeezed". This method of verification has the advantage that the ECC check is a real-time on-the-fly operation with dedicated hardware/firmware that already exists in the disk drive. In a second method of verification at 435, the verification can be done by comparing the readback of the SDT(i) data to the copy of the same data that is still resident in memory. This method is theoretically a more accurate verification because every bit is verified rather than just a ECC parity check.

If the data of SDT(i) is verified at 435, the method then repeats at 440 until i=N, where N is the number of SDTs in the band. The TR counter is incremented by 1 at 445, and then the next TR is written at 425. If at 435, the data read back from SDT(i) is not verified, this indicates there has been a write error and a write error counter (WEC) is incremented at 450. If the method of verification at 435 is by an ECC check, this indicates that there are errors in the readback data. The errors may be correctable by ECC or there may be too many errors to be corrected. At 455 a write error frequency (WEF) is calculated as WEF=WEC/WC. The counting of WC and WEC, and the calculation of WEF, could be for every write operation as shown in FIG. 4, or the counting and calculation can be on a sampled basis, for example for every tenth or hundredth write operation.

At 460, the data read back from SDT(i), which has been determined to have errors, is attempted to be corrected by writing tracks TR(i) and TR(i+1) a second time. If the method of verification is by comparing the readback of the SDT(i) data to the copy of the same data that is still resident in memory then the data is again written using data recalled from memory, as described above for blocks 420, 425. However, if the method of verification is by ECC check, then the data is attempted to be corrected with ECC and then re-written.

At 465 the actuator positions the read head to read SDT(i) and the re-written data is read back from SDT(i). At 470, the data read back from SDT(i) is again verified, using one of the two methods described above for block 435. If the data of SDT(i) is verified at 470, then the method returns to 440. If the data was re-written at 460 after ECC correction and the re-written data is now verified at 475, this indicates that there were some errors but they were correctable by ECC. In that case a correctable error counter (CEC) may be incremented at 472, after which the method returns to 440. The CEC monitors not complete-failures but near-failures where the number of errors in a block may still be correctable. The CEC value may be used to indicate a degradation of the recording media in certain regions of the disk. If the write errors cannot be corrected after the second write attempt, then at 475 a "re-try fail" is reported, after which the method returns to 440. While the method has been described with just two attempts to write the data, the method can include any number of attempts to write the data before a re-try fail is reported at 475.

If the WEF falls below a predetermined threshold, then WSV may be turned off at 405. For example, a WEF of one write error for every $10^6$ writes may be considered acceptable. The turning off of WSV improves the efficiency of writing to the bands because the time for the required disk rotations to read the SDTs is eliminated. The WEF may calculated for all write errors in all bands, or may be calculated as separate WEF values for each band or group of bands. Thus the WSV may be turned off for writing to just certain bands or groups of bands. Also, if WEF exceeds some predetermined threshold for a particular region of the disk (i.e., a particular band or group of bands), then that region may be re-formatted at a lower track density if the SMR disk drive includes the capability of formatting at different track densities.

The operation of the SMR disk drive as described above may be implemented as a set of computer program instructions stored in memory and executable by a processor, such as the HDC 212 (FIG. 1), or a separate controller or microprocessor in the disk drive. The controller performs logical and arithmetic operations based on the program instructions stored in memory, and is thus capable of performing the functions described above, including counting the number of writes (WC) and write errors (WEC), calculating the WEF and turning WSV off when WEF falls below a predetermined threshold.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A magnetic recording disk drive comprising:
   a rotatable magnetic recording disk comprising a substrate and a magnetic recording layer on the substrate;
   a head carrier having a recording-layer-facing surface;
   a write head on the head carrier, the write head adapted for generating a generally circular path of magnetic transitions in the recording layer as the disk rotates;
   an actuator connected to the head carrier for moving the head carrier generally radially across the disk, the actuator being capable of moving the head in an increment less than the radial width of a path, whereby the write head generates partially overlapping generally circular paths of magnetic transitions, the non-overlapping portions of the circular paths representing data tracks, wherein the data tracks are grouped on the recording layer in annular bands separated by annular gaps;
   a read head on the carrier for reading written data from the data tracks;
   a controller for selecting the band where data is to be written in the data tracks by the write head, the controller turning on a write-squeeze-verify (WSV) method for verifying the accuracy of data written in the data tracks in the selected band;
   memory coupled to the controller; and
   wherein the controller includes logic for executing write-squeeze-verify (WSV) method acts comprising:
   (a) writing data in a circular path;
   (b) writing data in an immediately radially adjacent circular path to thereby form a data track;
   (c) reading data from the data track;
   (d) verifying the accuracy of the data written in the data track; and
   (e) if the data written in the data track contains an error, recording the occurrence of a write error in memory;
   (f) repeating steps (b) through (e) for all data tracks in the selected band;
   (g) recording in memory the number of data tracks written and calculating, from the number of write errors recorded and the number of data tracks written, a write error frequency (WEF) for the selected band; and
   (h) if WEF is below a predetermined threshold, turning off WSV for subsequent writing to the data tracks in said selected band.

2. The disk drive of claim 1 further comprising reformatting said selected band at a lower track density if the WEF for said selected band exceeds a predetermined threshold value.

3. The disk drive of claim 1 wherein writing data further comprises writing error correction bits associated with said data to be written, and wherein the method act of (d) further comprises performing an error correction check using the error correction bits associated with said written data.

4. The disk drive of claim 1 wherein the method acts further comprise, if the data written in the data track contains an error, then prior to recording the occurrence of a write error in memory, repeating steps (a) through (d) for the data that contained an error.

5. A shingled magnetic recording disk drive comprising:
   a rotatable magnetic recording disk comprising a substrate and a perpendicular magnetic recording layer on the substrate;
   a write head for writing data in concentric shingled data tracks of the recording layer as the disk rotates, the data tracks being grouped in annular bands separated by annular gaps;
   a read head for reading data in the shingled data tracks;
   a controller for selecting a band where all the shingled data tracks in said selected band are to be written by the write head;
   memory coupled to the controller; and
   wherein the controller includes logic for executing write-squeeze-verify (WSV) method acts for verifying the accuracy of data written in the shingled data tracks in said selected band, the method acts comprising:
   (a) recording in memory the data to be written;
   (b) initiating WSV;
   (c) writing data and associated error correction bits in successive radially adjacent overlapping circular paths to thereby write successive radially adjacent shingled data tracks for all the data tracks in said selected band;
   (d) counting the shingled data tracks that have been written;
   (e) after the writing of each shingled data track and before the writing of the successive radially adjacent shingled data track, reading data from said written shingled data track;
   (f) verifying the accuracy of the data read from said written shingled data track by one of comparing the data read from said written shingled data track with the data recorded in memory, and performing an error correction check using the error correction bits associated with said written shingled data track;
   (g) if the data written in said written shingled data track contains an error, counting the occurrence of a write error and re-writing the data and associated error correction bits in said shingled data track containing the error;
   (h) reading data from said re-written shingled data track;
   (i) verifying the accuracy of the data read from said re-written shingled data track by performing an error correction check using the error correction bits associated with said re-written shingled data track; and
   (j) if said error correction check is successful, counting the occurrence of a correctable error, the correctable error count (CEC) being indicative of degradation of the recording layer in said selected band.

6. The disk drive of claim 5 wherein the method acts further comprise calculating, from the count of write errors and the count of shingled data tracks written, a write error frequency (WEF) for the selected band.

7. The disk drive of claim 6 wherein the method acts further comprise terminating WSV for the selected band if WEF is below a predetermined threshold.

* * * * *